United States Patent
Kelly et al.

(10) Patent No.: US 7,443,431 B2
(45) Date of Patent: Oct. 28, 2008

(54) FIXED PATTERN NOISE REMOVAL IN CMOS IMAGERS ACROSS VARIOUS OPERATIONAL CONDITIONS

(75) Inventors: Sean C. Kelly, Rochester, NY (US); Robert M. Guidash, Rochester, NY (US); Bruce H. Pillman, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 879 days.

(21) Appl. No.: 10/423,279

(22) Filed: Apr. 25, 2003

(65) Prior Publication Data

US 2004/0051796 A1 Mar. 18, 2004

Related U.S. Application Data

(63) Continuation-in-part of application No. 10/242,865, filed on Sep. 13, 2002, now Pat. No. 7,092,017.

(51) Int. Cl.
*H04N 9/64* (2006.01)
(52) U.S. Cl. ........................ 348/244; 348/262
(58) Field of Classification Search .................. 348/187, 348/188, 241–251, 262
See application file for complete search history.

(56) References Cited

U.S. PATENT DOCUMENTS

| 5,047,861 | A | | 9/1991 | Houchin et al. |
|---|---|---|---|---|
| 5,659,355 | A | * | 8/1997 | Barron et al. ................ 348/245 |
| 6,061,092 | A | * | 5/2000 | Bakhle et al. ................ 348/243 |
| 6,418,241 | B1 | | 7/2002 | Schreiner |
| 6,424,375 | B1 | | 7/2002 | Fowler |
| 6,522,355 | B1 | | 2/2003 | Hynecek et al. |
| 6,876,384 | B1 | * | 4/2005 | Hubina et al. ............ 348/223.1 |
| 6,888,568 | B1 | * | 5/2005 | Neter ...................... 348/222.1 |
| 2002/0171819 | A1 | * | 11/2002 | Cheung ...................... 355/133 |
| 2005/0253934 | A1 | * | 11/2005 | Yamagishi et al. ....... 348/222.1 |

FOREIGN PATENT DOCUMENTS

| EP | 0601534 | 6/1994 |
|---|---|---|
| GB | 2314227 | 12/1997 |

* cited by examiner

*Primary Examiner*—Tuan V Ho
(74) *Attorney, Agent, or Firm*—Thomas J. Strouse

(57) ABSTRACT

A method of minimizing noise in an image produced by an electronic imager comprising: determining a correction system for a range of imager integration times and a range of imager temperatures for an electronic imager which has taken a series of dark capture images and a series of flat field capture images in a calibration mode; and applying the correction system to an image produced by the electronic imager in an image capture mode.

10 Claims, 1 Drawing Sheet

FIXED PATTERN NOISE REMOVAL IN CMOS IMAGERS ACROSS VARIOUS OPERATIONAL CONDITIONS

CROSS REFERENCE TO RELATED APPLICATIONS

This application is a Continuation-In-Part application of U.S. patent application Ser. No. 10/242,865, filed Sep. 13, 2002 now U.S. Pat. No. 7,092,017.

FIELD OF THE INVENTION

This invention applies generally to the field of electronic photography and relates in particular to providing smoothed digital images with reduced noise.

BACKGROUND OF THE INVENTION

In electronic photography, CMOS imagers can possess higher levels of imager noise than their predecessors CCD imagers. This noise can be of the form of temporal variation and fixed pattern noise. Fixed pattern noise includes Dark Fixed Pattern Noise, which is the pixel to pixel variation in response offset and Pixel Response Non-Uniformity which is the pixel to pixel variation in response to a given exposure.

Noise reduction is practiced in the art using dark fixed pattern subtraction as in U.S. Pat. No. 6,424,375. Here an electronic circuit is used to remove dark fixed pattern noise by electronically adjusting pixel responses to align them to an aim response. U.S. Pat. No. 6,418,241 discloses a system in which column biases are corrected after measuring the average of each column and adjusting each column to some aim bias. The Canon D30 digital camera also apparently performs dark captures with the shutter closed in order to obtain an estimate of the sensor's dark frame response. Also proposed is to use a dark frame capture and a flat field capture before every image capture. This is a practical impossibility in typical picture taking. There is thus a need for improved technique for minimizing fixed pattern noise.

SUMMARY OF THE INVENTION

According to the present invention, there is provided a solution to the problems of the prior art.

According to a feature of the present invention, there is provided a method by which noise can be removed from a digital image captured with an image sensor operating over a wide range of environmental and operational conditions. This method removes both dark fixed pattern noise and pixel response non-uniformity which vary as a function of imager temperature and imager integration time.

ADVANTAGEOUS EFFECT OF THE INVENTION

The invention has the following advantages.

1. Dark fixed pattern noise correction is optimized to correct dark fixed pattern noise associated with imager integration time and imager temperature.
2. Pixel response non-uniformity correction is optimized for a range of operational conditions of imager integration time and imager temperature.
3. In an alternate embodiment, the mean of dark pixels of the imager captured concurrent with the image are used to adjust both dark fixed pattern noise and the pixel response uniformity.

DETAILED DESCRIPTION OF THE INVENTION

Figure 1:
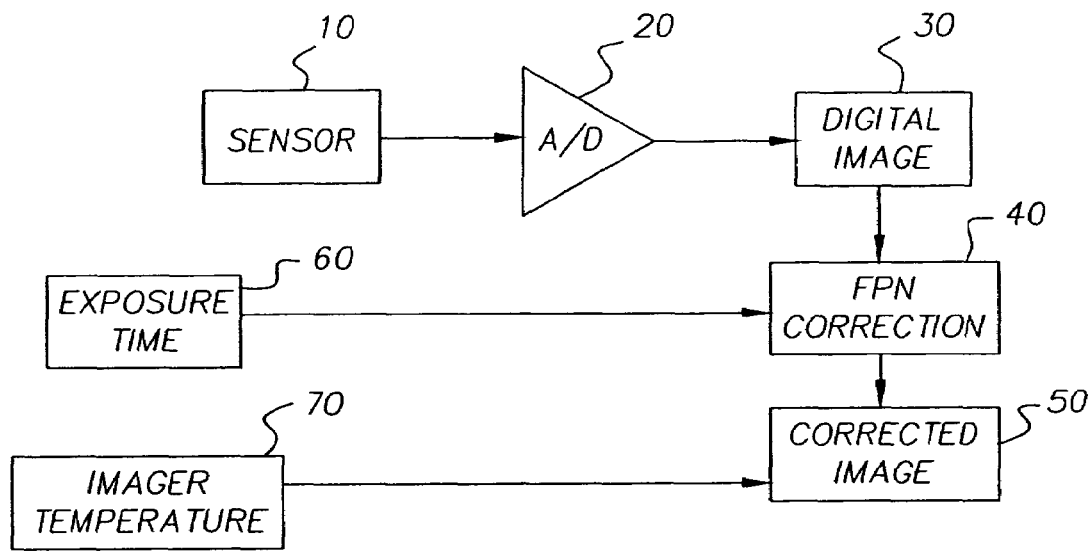
FIGS. 1 and 2 are block diagrams of embodiments of the invention.

Image Sensors can produce an undesirable response known as fixed pattern noise (FPN). FPN is defined as a non-image pattern produced by an image sensor that does not change from capture to capture. Temporal noise, by contrast does change from capture to capture and is random. The present invention addresses FPN. There are two types of FPN, dark fixed pattern noise and pixel response nonuniformity (PRNU). Dark FPN is described as pixel to pixel offset in response when operating the imager in the absence of incident illumination (e.g., the shutter is closed or the lens is capped). PRNU is described as the response of an already dark FPN corrected imager, to uniform incident illumination (e.g., imager imaging an integrating sphere). The present invention effects the correction of both of these types of noise (Dark FPN, PRNU) across a range of operational conditions (imager temperature and imager integration time).

While the image noise the invention reduces is referred to as fixed pattern noise, it does vary with the operational conditions of imager integration time and temperature. This variation is however quite predictable, where temporal noise is highly variable from capture to capture and unpredictable.

The strategy or procedure followed in this invention is to perform a calibration in which the imager is temperature controlled across the range of temperatures the imager will experience in use, and for each temperature, the imager is also operated across the full range of imager integration times. One can envision a 2D matrix of time and temperature:

| | $1/250$ sec | $1/125$ sec | $1/60$ sec | $1/30$ sec | $1/15$ sec | $1/8$ sec | $1/4$ sec | $1/2$ sec | 1 sec | 2 sec | 4 sec | 8 sec |
|---|---|---|---|---|---|---|---|---|---|---|---|---|
| 0 deg C. | | | | | | | | | | | | |
| 5 deg C. | | | | | | | | | | | | |
| 10 deg C. | | | | | | | | | | | | |
| 15 deg C. | | | | | | | | | | | | |
| 20 deg C. | | | | | | | | | | | | |
| 25 deg C. | | | | | | | | | | | | |
| 30 deg C. | | | | | | | | | | | | |
| 35 deg C. | | | | | | | | | | | | |
| 40 deg C. | | | | | | | | | | | | |
| 45 deg C. | | | | | | | | | | | | |
| 50 deg C. | | | | | | | | | | | | |
| 55 deg C. | | | | | | | | | | | | |
| 60 deg C. | | | | | | | | | | | | |

In each cell of this matrix, a series of dark captures (e.g., lens capped) are taken and a series of flat fields (e.g., integrating sphere) are captured. The dark captures are averaged together in order to remove temporal noise from the estimate of the dark fixed pattern noise at that time and temperature. The flat field captures are similarly averaged together, but only after they have been each individually corrected for dark FPN. This is achieved by subtracting the dark FPN estimate computed above (by averaging together each dark frame), from each individual flat field captures. After each individual flat field image has been dark corrected, they can all be averaged together. This frame averaged flat field image shows any pixel response variation residual in the image. Each color channel is then used to form an aim response to which all pixels will be gained. The aim response is defined as the average of each color channel in the center ¼ of the imager's format. After the 3 aim values are defined (e.g., RGB), a per pixel gain is computed.

That gain is defined as:

$$Gain_{ij} = Aim_{Red}/PixRsp \text{ if a Red Pixel}$$

$$Gain_{ij} = Aim_{Green}/PixRsp \text{ if a Green Pixel}$$

$$Gain_{ij} = Aim_{Blue}/PixRsp \text{ if a Blue Pixel}$$

This invention uses one or more dark frames in a calibration phase to estimate a dark current generation rate for each pixel, then use this model to calculate a dark frame to be subtracted during processing for a particular scene.

One model is:

$$CV_D(r, c) = Gs(r, c)\frac{At}{q}e^{-(E_G-E_T)/kT}$$

In this equation:

$CV_D(r,c)$ is counts of dark current signal, for each pixel (row, column index)

G is the analog gain level $s(r,c)$ is a scaling factor for current generation for each pixel A is pixel area, q is the charge an electron, $E_G$ is the band gap, $E_T$ is the impurity energy gap, t is integration time, k is Boltzmann's constant, and T is temperature in Kelvin. By acquiring one or more dark frames at a calibration time, we can estimate:

$$s(r, c) = CV_{DC}(r, c)\frac{q}{G_C A t_C}e^{(E_G-E_T)/kT_C}$$

In this equation, $CV_{DC}(r,c)$ is a mean dark frame at calibration time, $G_C$ is the analog gain at calibration time, $t_C$ is the integration time for the calibration frames, and $T_C$ is the sensor temperature for the calibration frames. This estimation is actually oversimplified, because an actual dark frame has our usual pattern, lag and nonlinearity artifacts. Thus, $CV_{DC}(r,c)$ is really a dark frame after having lag, column offset, column gain, and linearity correction applied.

After both dark FPN and PRNU correction maps are defined per cell in the matrix above (across operational time and temperature), the functional relationship between the independent variables of time and temp and measured dark FPN and PRNU maps is assessed. The imager's nominal (nominal or typical operational conditions) FPN, at a minimum will be scaled and or biased as a function of integration time and temperature when the imager is operating in other than nominal operational conditions. That functional relationship is determined with regression. The regressions are linear, higher order or an exponential function in time and temperature.

The estimates of both dark FPN and PRNU correction images are improved estimates relative to performing a dark field capture and a flat field captures before every image capture, since the invention provides multiple frame averaging at calibration time, thus removing any temporal noise from these map estimates. An alternative embodiment of the invention is to make the biasing and scaling functions dependent on only the mean dark response taken from the imager's dark pixels, at time of scene capture.

Referring to FIG. 1, there is shown an embodiment of the invention. As shown, a digital camera includes an image sensor 10 which produces an analog image of a scene and analog to digital converter (A/D) 20 which converts the analog image to a digital image 30. According to the invention as discussed above, exposure (integration) time and imager temperature corrections 60 and 70 are used to correct the digital image 30 for fixed pattern noise to produce a corrected image 50.

Figure 2:
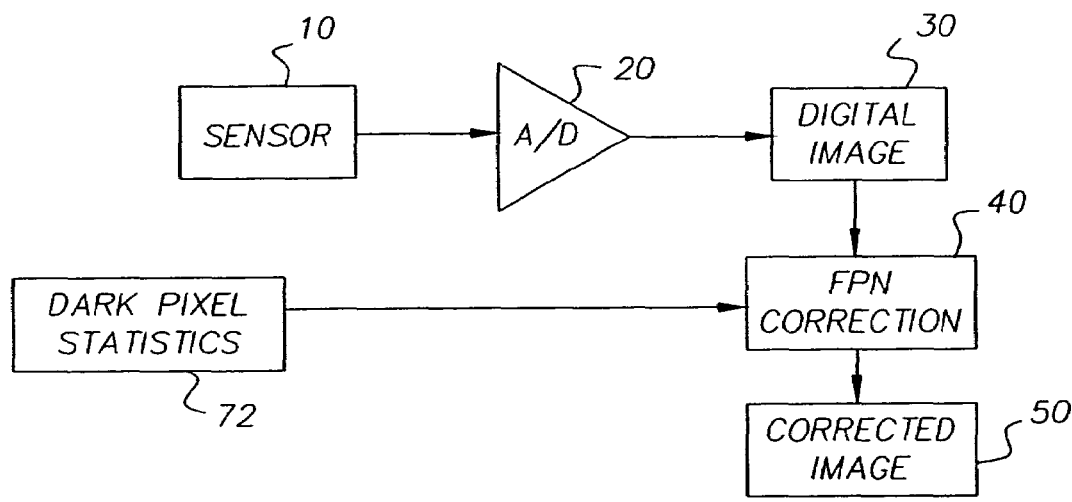

FIG. 2 shows an alternative embodiment wherein fixed pattern noise correction 40 is dependent on the mean dark response taken from the sensor 10 dark pixels 72 at the time of the scene capture.

The invention has been described in detail with particular reference to certain preferred embodiments thereof, but it will be understood that variations and modifications can be effected within the spirit and scope of the invention.

PARTS LIST 10 sensor
20 analog to digital converter
30 digital Image
40 FPN correction
50 corrected image
60 exposure time
70 imager temperature
72 dark pixel statistics

What is claimed is:

1. A method of minimizing noise in an image produced by an electronic imager comprising:
    generating a correction system having a range of imager integration times and a range of imager temperatures for an electronic imager which has taken a series of dark capture images and a series of flat field capture images in a calibration mode; and
    applying said correction system to a plurality of images having different integration times or imager temperatures produced by said electronic imager in an image capture mode without reentering the calibration mode by using the correction system to perform regression analysis for the different integration times or imager temperatures.

2. The method of claim 1 wherein said generating a correction system includes generating a single fixed pattern noise (FPN) dark map and a singe FPN pixel response non-unifonnity (PRNU) map based on said series of dark capture images and said series of flat field capture images.

3. The method of claim 1 wherein said generating a correction system includes taking a series of dark capture images and a series of flat field images for each temperature and imager integration time of a matrix of a plurality of temperatures and imager integration times, averaging the dark capture images for each said temperature and imager integration time to remove temporal noise, connecting each flat field image by subtracting said averaged dark capture image, and averaging said flat field images to produce a pixel response non-uniformity correction.

4. The method of claim 1 wherein said electronic imager has three different color channels and wherein said correction system effects an aim response in each said color channel to which all pixels will be gained and per pixel gain is then computed.

5. The method of claim 4 wherein said three color channels are R(Red), (G)Green, (B)Blue color channels.

6. A method of minimizing noise in an image produced by an electronic imager comprising:

generating a correction system having a range of imager integration times and a range of imager temperatures for an electronic imager which has taken a series of dark capture images and a series of flat field capture images in a calibration mode;

applying said correction system to a plurality of images having different integration times or imager temperatures produced by said electronic imager in an image capture mode without reentering the calibration mode;

wherein said electronic imager has three different color channels and wherein said correction system effects an aim response in each said color channel to which all pixels will be gained and per pixel gain is then computed; and said aim response is defined as the average of each color channel in the center region of the imager's format.

7. The method of claim 6 wherein said center region is ¼ of the center of the imager's format.

8. A method of minimizing noise in an image produced by an electronic imager having image capture pixels and dark pixels comprising:

generating correction maps for a range of integration times, each map associated with different imager dark pixel values during a calibration mode;

capturing a plurality of images and for each image adjusting the correction maps as a function of the captured image dark pixel values using regression at the time of image capture without reentering the calibration mode; and correcting each captured image with the adjusted correction maps.

9. The method of claim 8, wherein adjusting the correction maps further comprises adjusting a dark fixed pattern noise map and pixel response nonuniformity map.

10. The method of claim 8, wherein adjusting the correction maps further comprises adjusting a dark fixed pattern noise map.

* * * * *

UNITED STATES PATENT AND TRADEMARK OFFICE
CERTIFICATE OF CORRECTION

PATENT NO. : 7,443,431 B2 Page 1 of 1
APPLICATION NO. : 10/423279
DATED : October 28, 2008
INVENTOR(S) : Robert M. Guidash et al.

It is certified that error appears in the above-identified patent and that said Letters Patent is hereby corrected as shown below:

Claim 2, line 3  "singe" should be replaced with --single--.

Claim 2, line 3  "non-unifonnity" should be replaced with --non-uniformity--.

Signed and Sealed this

Seventeenth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,443,431 B2  Page 1 of 1
APPLICATION NO. : 10/423279
DATED : October 28, 2008
INVENTOR(S) : Robert M. Guidash et al.

It is certified that error appears in the above-identified patent and that said Letters Patent is hereby corrected as shown below:

Column 4, Claim 2, line 48    "singe" should be replaced with --single--.

Column 4, Claim 2, lines 48 and 49    "non-unifonnity" should be replaced with --non-uniformity--.

This certificate supersedes the Certificate of Correction issued February 17, 2009.

Signed and Sealed this

Seventeenth Day of March, 2009

JOHN DOLL
*Acting Director of the United States Patent and Trademark Office*